Dec. 23, 1969            G. WALDES            3,485,691
METHOD OF SEALING THE ENDS OF ZIPPER LENGTHS CUT
FROM A CONTINUOUS FASTENER CHAIN
Filed Dec. 5, 1966            2 Sheets-Sheet 2
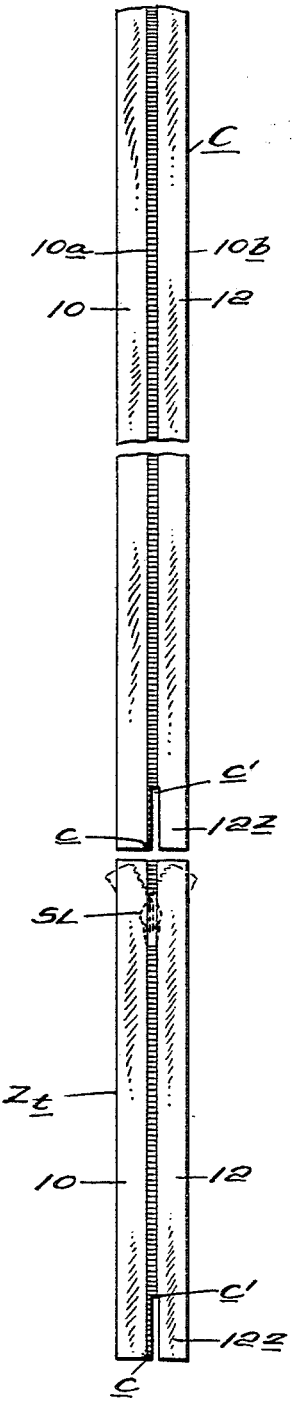
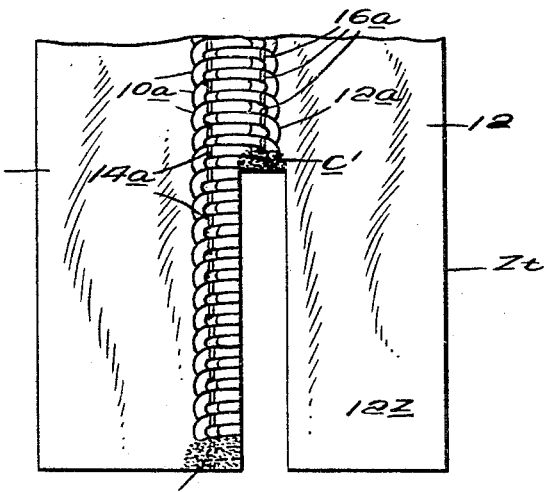
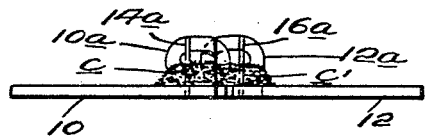
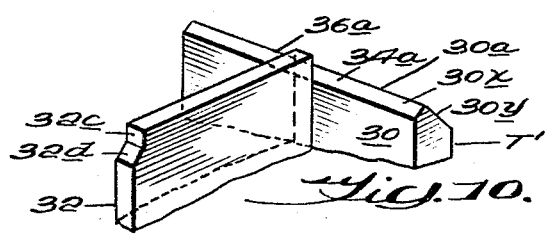
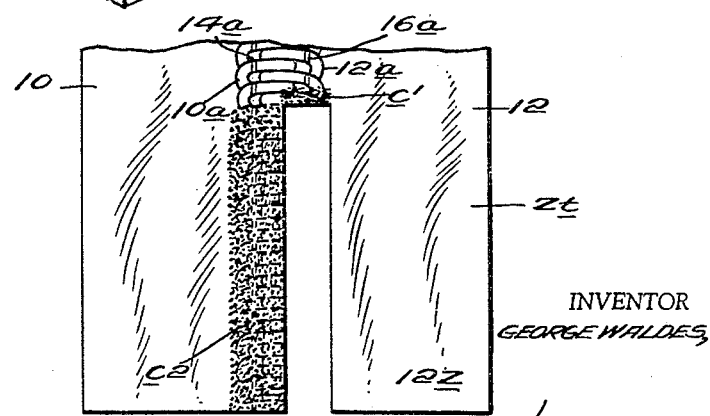
INVENTOR
GEORGE WALDES,
BY J. Harold Kilcoyne
ATTORNEY United States Patent Office 3,485,691
Patented Dec. 23, 1969

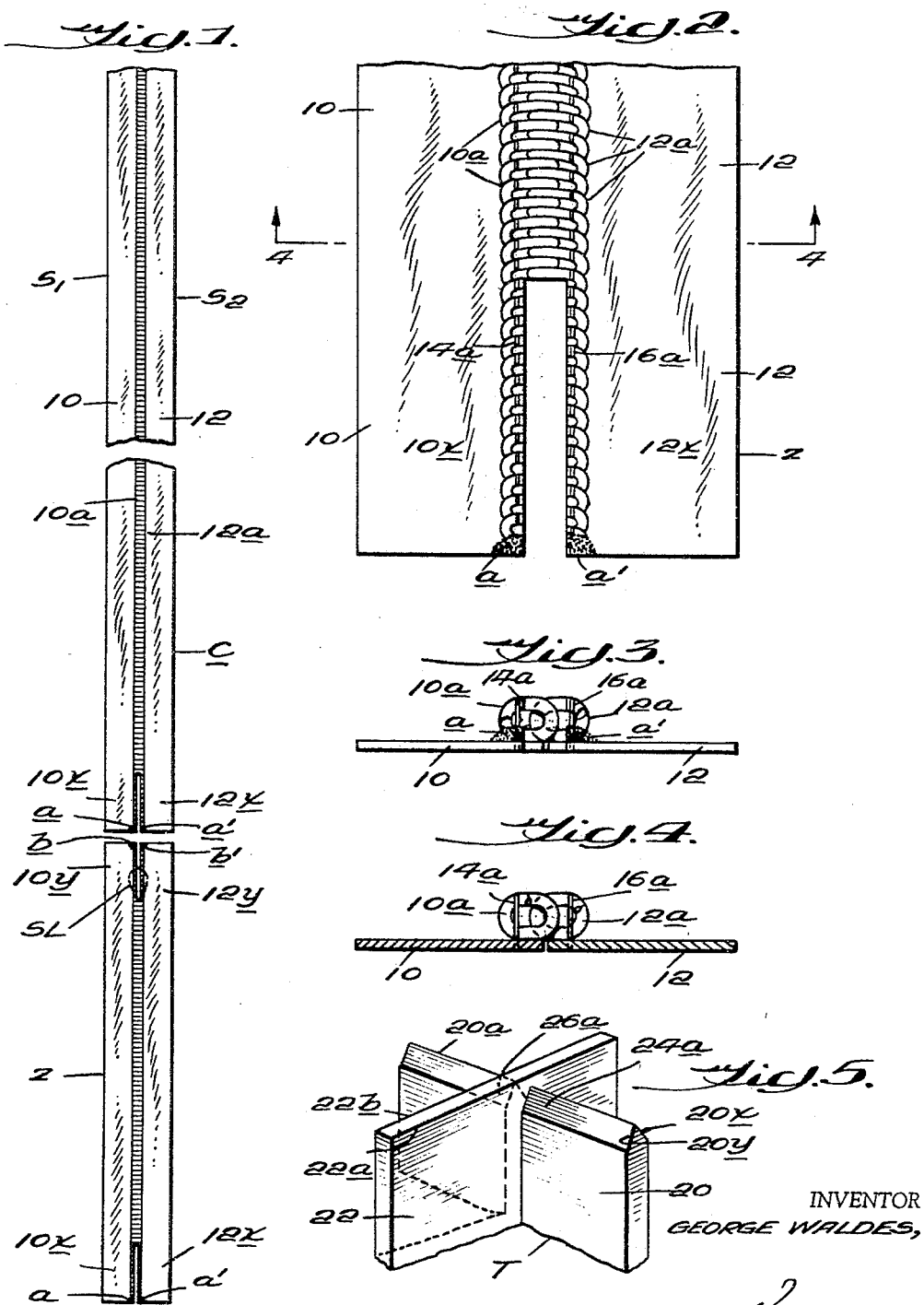

3,485,691
METHOD OF SEALING THE ENDS OF ZIPPER LENGTHS CUT FROM A CONTINUOUS FASTENER CHAIN
George Waldes, Plandome, Manhasset, N.Y., assignor to Waldes Kohinoor, Inc., Long Island City, N.Y., a corporation of New York
Filed Dec. 5, 1966, Ser. No. 599,315
Int. Cl. A44c 19/36
U.S. Cl. 156—88                          10 Claims

ABSTRACT OF THE DISCLOSURE

Method of overcoming the problem of the plastic coils of so called plastic zippers, when produced by cutting same to desired length from continuous plastic coil chain, "sticking up" from and/or shifting position laterally on their carrying tapes adjacent their cut-through ends, consequent to the threads of the stitches which secure the plastic coils to said tapes being also cut through as an incident to zipper production as aforesaid. In general, said method comprises the steps of (1) cutting apart a succession of zipper-closure lengths of chain from said continuous chain along transverse lines of cut extending across said tapes, coils and lines of stitches, and (2) applying heat and pressure sufficient to soften and thereupon re-shape predetermined portions of those convolutions of the coils or one of them which are disposed adjacent said lines of cut in such manner that said portions form thread seals which fix the cut ends of the threads of the coil-securing stitches to the tape or tapes proper.

---

This invention relates generally to slide fastener manufacture, and more particularly to a method of producing improved slide fasteners, also commonly referred to as zippers, from continuous fastener chain of the type employing as the fastening means thereof coils or helices of plastic filaments sewn to their respective tapes as by longitudinal rows of stitches, and the improved product thereof.

In the proper method of zipper production from continuous chain as aforesaid, a problem arises consequent to the cutting of the individual zipper lengths from the continuous chain. More particularly, when the thread or threads of the stitches which secure the plastic coils or helices (hereinafter for convenience referred to simply as "plastic coils") to their tapes are severed during the course of the zipper lengths being cut to length from the chain, they tend to loosen whereupon the ends of the plastic coils, because of their inherent springiness, tend to "stick up" from the tapes by an amount greater than the inside dimension of the channel of the slider which is to be assembled to said zipper length to render it operative as a zipper, and this of course makes for difficulty in slider assembly.

The particular end structure which must be given the lower end of the tapes of each zipper length of fastener chain as adapts same for use as a fly closure for men's trousers, pants, etc. gives rise to yet another impediment to ready slider assembly. In explanation, trouser-fly zippers are not formed with the conventional fastener-free tape extensions at both ends thereof as are most garment zippers. Rather, zippers for such use are not required to have any fastener-free tape extensions at their upper ends, because such ends extend into and are sewn into the trouser waistband, and their bottom ends must be specially formed to permit the lower end of the zipper chain to be sewn into the trouser crotch portion, as well as to enable slider assembly thereto. Such with the plastic-coil zipper requires that the plastic coil of one of the zipper stringers be cut away entirely from its tape for a length corresponding to the conventional tape extension, whereas the palstic coil of the companion tape is left on its tape and thus extends fully to the bottom edge of the latter. Thus, when the threads of the stitching which secures the retained end portion of the plastic coil loosen from the tape mounting same, the tendency of the plastic coil to "stick up" increases inasmuch as it lacks such hold-down force as the plastic coil of the companion tape would impart thereto if the latter were also retained rather than being removed.

Stated generally, the object of the present invention is the provision of a method of producing zipper lengths of slide fastener chain from continuous chain employing plastic coil as the fastening means thereof, which substantially overcomes the afore-mentioned difficulties in assembling the slider required to open and close the final zipper to each said zipper length.

A more particular object of the invention is the provision of a method by which the threads of the stitches which secure the coils of plastic-coil type zippers produced by cutting same to lengths as required from continuous plastic-coil chain to their respective tapes are prevented from loosening from said tapes at or adjacent their ends which are cut through incident to the cutting of the zipper lengths from said continuous chain.

Another object of the invention is the provision of a method of sealing the cut ends of the threads of the stitches which secure the plastic coils of Zipper-lengths of slide fastener chain cut from continuous plastic-coil slide fastener chain to their respective tapes.

Yet another object of the invention is the provision of a method or methods as aforesaid which is equally adaptabe to the production of zipper lengths of plastic chain for general use and which are provided with conventional tape extensions at both ends thereof and to the production of zipper lengths of plastic-coil chain as used in the pants trade, i.e. zipper lengths characterized by a tape extension at the bottom end of the one tape only which is to be sewn into the crotch portion of the pants or trousers.

Another object of the invention is the provision of a method as aforesaid which is capable of being practiced or applied during the operation of severing or "cutting apart" the individual zipper lengths from said continuous chain and through the use of the same cutting-punch type of tool that is employed to severe said individual lengths from the continuous chain.

A further object of the invention is the provision of a rethod, well suited to the requirements of the manufacturer of garments such as pants, trousers, slacks, shorts, etc. employing the so-called continuous chain method of producing plastic-coil zippers which serve as the closure for the flies of such garments, of imparting to the lower ends of the individual zipper lengths of chain cup from said continuous chain the structure and configuration enabling simple and speedy assembly of the slider for operating the fly closure to said individual zipper lengths.

In its product or article aspects, the invention further contemplates and aims to provide individual zipper lengths of plastic coil-type slide fastener chain characterized by at least a bottom-end construction which greatly facilitates the assembly of the sliders for operating the final zippers to the zipper-chain components thereof.

The above and other objects and features of the invention will be more readily understood from a consideration of the following detailed description read in light of the accompanying illustrative drawings, in which:

FIG. 1 is a plan view intended to illustrate the general structure both of a continuous plastic-coil slide fastener chain of indeterminate length and of one of the individual zipper lengths having so-called tape extensions at both ends thereof which has just been cut to the size required from the lower end of said continuous chain;

FIG. 2 is a greatly enlarged plan view of the bottom end of each individual zipper length of chain cut from the continuous chain according to the invention;

FIG. 3 is an end view of the zipper length of chain shown in FIG. 2;

FIG. 4 is a transverse sectional view taken on line 4—4 of FIG. 2;

FIG. 5 is a broken-away inverted perspective view of a so-called hot knife employed according to the invention in cutting off individual zipper lengths of chain from a continuous chain and simultaneously therewith sealing the cut-through ends of the threads of the stitches which secure the plastic-coil components of said chains to their respective tapes;

FIGS. 6, 7, 8 and 9 are views which correspond generally to FIGS. 1, 2, 3 and 5, respectively, while at the same time illustrating the bottom end portion of a zipper length of plastic-coil chain of the type satisfying the requirements of a fly-closure zipper and further illustrating the modified hot knife employed in fashioning same; and FIG. 10 is a view corresponding generally to each of FIGS. 2 and 7 but illustrating a modified bottom-end construction for zipper lengths of plastic-coil chain also for use in making up trouser-fly closures.

Referring to the drawings in detail and first considering FIGS. 1–5 inclusive thereof, FIG. 1 in its upper portion generally illustrates a long length of continuous slide fastener chain C comprising a pair of fastened-together stringers $S_1$ and $S_2$, and in its lower portion a cut-off zipper length of chain designated Z assumed to have just been cut from said continuous chain. The aforesaid stringers which comprise said continuous chain and of course each cut-off zipper length are made up of flexible tapes 10 and 12 carrying plastic-coil type fastening means 10a, 12a along their adjacent longitudinal edges thereof. As is well understood, the tapes provide means for securing the individual zipper stringers to opposite sides or parts of a garment, and the plastic coil fastening means 10a and 12a constitute the means for fastening the stringer tapes along adjacent edges with movement of a slider SL (indicated in broken lines) in upward direction, and unfastening same with movement of the slider in downward direction.

It is to be understood that the plastic coils 10a, 12a are each formed of a plastic filament shaped to coil or helical formation and are secured to the adjacent edges of their respective fabric tapes 10, 12 by lines of stitching designated 14a, 16a. While any one of the prior art forms of plastic coil or filament-type fastening means may be employed according to the invention, the plastic coils shown for purpose of simple disclosure are characterized by the individual loops or convolutions thereof having somewhat flattened or oval configuration and further being disposed in generally parallel relation. FIG. 3 in particular illustrates further that the relatively inner-end portions of the loops or convolutions intermesh with one another, that the threads of the stitching 14a, 16a secure the relatively outer-end portions of the loops to their tapes, and that the stitch rows locate the loops or convolutions in a position transversely of the tapes such that their said inner-end portions project well beyond the corresponding inner edges of said tapes.

It is explained further that while FIG. 2 shows only the tape extensions designated 10x, 12x, which are conventionally provided on the bottom ends of the tapes of each zipper length of fastener chain, FIG. 1 makes it clear that the top end of each such zipper length will also be provided with corresponding tape extensions which are therein designated 10y, 12y. Accordingly, it will be appreciated that the zipper lengths of chain presently described are of the type intended for general garment-and-article-closure use, as distinguished from zipper lengths of chain intended for trouser-fly closure use, for which latter application the tapes of the zipper-length chains are devoid of top extensions and the bottom ends of the tapes are specially configured, as will be hereinafter described.

When severing individual zipper lengths of chain from a long strip of continuous fastener chain, it was known to provide at the same time the aforesaid top and bottom tape extensions by cutting away the intermeshed or coupled inner-end portions of the loops of convolutions of the plastic coils for short lengths of chain extending to both sides of the transverse lines of cut made through the chain tapes in the zipper-length cutting-off operation. The means for effecting both tape severance and the cutting-away of the intermeshed inner-end portions of the plastic coils conventionally took the form of a reciprocatory punch-type tool generally designated T having approximate cruciform configuration as shown in FIG. 5, that is, one combining a transversely arranged knife blade 20 of length at least as great as the full width of the continuous chain C and having a transverse, sharply beveled cutting edge 20a, and a longitudinally extending punch blade 22 fixedly secured to said knife blade 20 at the vertical center line of the latter and extending at a right angle therefrom and for equal distances corresponding to the desired length of the tape extensions to be provided from both sides of said knife blade, and being further provided with longitudinally extending, parallel cutting edges 22a, 22b disposed slightly below the plane of said cutting edge 20a and which are spaced apart a distance such that the punch is adapted to cut away the intermeshing inner-end portions only of the oppositely disposed loops or convolutions of the intermeshed plastic coils corresponding to the aforesaid plastic coils 10a, 12a. By reciprocating such a tool combining a tape-cutting knife and a coil cutting-away punch against a continuous chain C being fed intermittently in increments corresponding to the required length of zipper between each working stroke of said tool, a succession of zipper lengths of chain each having tape extension corresponding to those designated 10x, 12x and 10y, 12y at the opposite ends thereof may be produced from continuous chain at a fast rate.

However, when the cutting edge 20a of the knife 20 cuts through the tapes 10 and 12, it also cuts transversely across the threads of the rows of stitches 14a, 16a which secure the outer-end portions of the loops or convolutions of the plastic coils 10a, 12a which remain on and are still secured by said stitches to said tapes at the ends of the latter. When so cut, the stitches tend to loosen adjacent the cut-across ends of the tapes, and when such occurs, the ends of the plastic coils tend to "stick up" from their tapes. This is particularly objectionable when occurring at the bottom ends of the zipper lengths, since it is to such ends that the slider SL for operating the final zipper in normal use thereof must be assembled. And of course any lateral displacement of the bottom ends of the remaining outer-end portion of the loops or convolutions of the partially cut-away plastic coils from their initially fixed, sewn-down position resulting from stitch loosening can also seriously interfere with the slider assembly operation.

According to the invention, the possibility of the stitches 14a, 16a loosening from their respective tapes adjacent the transverse lines of cut made through the latter and the threads which form said stitches is substantially eliminated by the herein proposed, relatively simple procedure of applying heat and pressure to the outer-end portions of the endmost loops or convolutions, i.e. a small number thereof disposed closely adjacent said transverse lines of cut, of the plastic coil or coils which remain secured to their tapes by said stitches following the action of the punch 22 in cutting away the intermeshing inner-end portions of said loops or convolutions, requisite to the softening or fusing of the plastic material of said endmost remaining portions and thereupon the reshaping thereof into small-area plastic seals which seal the cut thread ends to their respective tapes.

Preferably, heat is applied to the aforesaid remaining outer-end portions of said loops or convolutions still secured to the tapes directly through the knife-blade 20 which, together with the punch 22, is bodily heated by means of one or more heating elements built into the tool holder which mounts said blade and punch. While the details of such a heated tool have not been shown, they are well known since the tool in question falls in the category of one known in the art as a "hot knife."

Preferably also, pressure required to reshape the plastic material of the outer-end portions of the loops or convolutions of the coils remaining on the tapes as aforesaid is applied through said tool T, but only locally to the endmost ones of said outer portions. More particularly, the required pressure is applied by the blade-edge portions designated 24a, 26a which are disposed just to the sides of the punch 22 and which, by virtue of the fact that they are portions of the blade edge 20a which, in cutting through the tapes and coils in the zipper-length cutting-apart operation, actually form the ends of said zipper lengths, are favorably disposed to act on only the endmost of said outer-end portions of the coils or loops remaining on the tapes.

The degree of pressure which said blade-edge portions 24a, 26a are capable of exerting on the endmost of said outer-end portions of the plastic loops or convolutions remaining on the tapes is obtained by proper choice of the angle or angles of the beveled or inclined edge surfaces 20x, 20y which intersect to form said cutting edge 20a, being such that said surfaces will exert a substantial component of downward force against the coil portions which they engage when the blade 20 is reciprocated against the latter.

Of course it is to be understood that other forms of pressure applying means than the blade portions 24a, 26a may be employed. But regardless of its specific structure, the pressure applying means in all cases will function to mash down and reshape said outer-end portions of the endmost cut-through loops or convolutions of the plastic coils remaining on their respective tapes following the action of the punch blade 22 in cutting away their intermeshing inner-end portions, upon said outer-end portions being softened or fused to a flowable state or condition by the heat imparted thereto by the heated blade 20.

Thus, when the tool T is reciprocated against a continuous plastic-coil chain C, it not only cuts apart therefrom a predetermined length of chain corresponding to a desired zipper length and substantially simultaneously therewith cuts away and removes the intermeshed inner-end portions of the plastic coil components of said chain for short lengths thereof extending to the opposite sides of the line of zipper-length severance from the chain proper, but also, consequent to at least the cutting blade 20 being heated and being further provided with pressure-applying edge portions 24a, 26a located as aforesaid, it effects softening and reshaping of the outer-end portions of the endmost loops or convolutions of said plastic coils which remain secured to their respective tapes by the threads of the stitches 14a, 16a to the form of small-area plastic spots which effectively seal the cut-through ends of the threads of said stitches resulting from the zipper-length severing operation to their respective tapes at those very locations where they would tend to loosen therefrom. Stated otherwise, said plastic spots formed of the plastic material of the endmost outer-end portions of the loops or convolutions making up the plastic chains provide "thread seals" which effectively seal the cut ends of the threads of the stitching in place in manner broadly comparable to the action of known wax seals which seal the ribbon or ribbons of a ribboned document in place.

While FIG. 2 shows the plastic-spot seals designated a and a' to be formed at the bottom end only of each zipper length of plastic coil chain Z, it will be understood that the same stroke of the tool T which forms same also will form identical plastic-spot seals designated b, b' in FIG. 1 at the upper ends of each zipper length Z as it is severed from the continuous chain proper. Thus, as each zipper length of chain Z is cut from the long strip of continuous chain C, it will be provided with tape extensions at both ends thereof and also with plastic-spot thread-to-tape seals a and a' at its bottom end and identical seals b and b' at its top end.

Referring to FIGS. 6–9, which are intended to illustrate the application of the method of the invention to the production of zipper lengths of plastic-coil fastener chain of the type used in making trouser-fly closures by the so-called continuous chain method, such in the first instance contemplates the provision of a continuous plastic-coil chain C comprising fabric tapes 10, 12 and fastening means in the form of plastic coils 10a, 12a secured to adjacent longitudinal edges thereof by longitudinal lines or rows of stitches 14a, 16a and which is in all respects identical to the continuous plastic-coil chain C shown in FIG. 1. However, the zipper lengths $Z_t$ cut therefrom for use in trouser flies differ from the previously described zipper lengths Z in that such are each provided with a so-called tape extension at the bottom end only and then usually only on the one (right-side) tape which is to be sewn into the crotch portion of the trousers for which it is to serve as a fly closure, there being no requirement for a corresponding tape extension or extensions at its top ends since the latter are inserted and sewn into the trouser waistband. Accordingly, as will be seen in FIG. 9, the tool T' employed in cutting off individual zipper lengths $Z_t$ from the continuous chain C has modified or T-configuration as distinguished from the cruciform configuration of the tool shown in FIG. 5.

That is to say, said tool T' comprises a transversely extending knife blade 30 and a longitudinally extending punch 32 comparing generally to the knife blade 20 and punch blade 22 of the FIG. 5 tool but differing therefrom in that the punch 32 extends vertically from only one face of the knife blade 30, rather than from both faces as with the FIG. 5 form of tool.

Other lesser differences are that the punch 32 is slightly offset to one side of the vertical plane which extends centrally and at a right angle through the knife blade 30 and is somewhat wider than the corresponding punch blade 22 of the tool T, whereby its action is to cut away the entire width of the right-side plastic coil 12a, as well as the edge portion of the tape 12 to which said coil is sewn, for the length of the coil and tape corresponding to the length of the tape extension to be provided, this in addition to cutting through and removing the inner-end portions of the loops or convolutions of the left-side plastic coil 10a.

Thus, when the tool T' is reciprocated against the continuous chain C, it will by the action of the punch 32 cut away both the right-side plastic coil 12a for the full width thereof and the tape edge-portions to which it is secured for a length portion of coil and tape corresponding to the length of the tape extension to be provided, thus to form the desired coil-free tape extension (designated 12z) thereon; it will further, again by the action of said punch 32, cut through and remove the inner-end portions of the loops or convolutions of said left-side plastic coil 10a which previously were intermeshed with the coils or convolutions of the cut-away portion of the right-side coil, while leaving on the tape and still secured thereto by the line of stitches 14a the partial or outer-end portions of the loops or convolutions of said left-side plastic coil 10a for a length thereof corresponding to said tape extension formed on the right-side tape 12; and finally, by the action of the blade 30, it will cut apart from the continuous chain a zipper length of chain $Z_t$.

Since the aforesaid punch and knife operation cuts through the line of stitches 16a on a tranverse line of cut just above the tape extension 12z and further cuts through the line of stitches 14a on a tranverse line of cut defining the bottom end of each zipper length, there is the danger of the threads of either or both lines of stitches 14a, 16a loosening immediately above said two vertically spaced lines of cut, and consequent to such loosening, of the partially cut-away coil 14a and/or the full coil 16a "sticking up" from or being disposed laterally of their tapes adjacent their relatively bottom ends.

According to the invention, this possibility of thread or stitch loosening is positively prevented by sealing the cut-through ends of the threads of both lines of stitches to their tapes. To this desirable end, the blade 30, in addition to being heated by the heating coil incorporated into the tool holder, all as aforesaid, incorporates pressure-applying blade-edge portions 34a, 36a corresponding generally to the aforesaid pressure-applying formations 24a, 26a provided on the knife blade 20 but differing therefrom in two respects. First, said formations are effectively disposed to only the one beveled side or face of the blade edge nearest the punch 32, rather than extending to both sides of the knife blade 20, as with the FIG. 5 tool. Illustratively, said blade-edge portions 34, 36a are provided by inclining the beveled cutting-edge defining surface 30x at a lesser angle to the vertical than the intersecting beveled-edge defining surface 30y. And second, the end cutting-edge of the punch 32 which makes the cut through the right-side coil 12a is provided with a set-back designated 32c which connects to a beveled end-edge 32d at the same elevation and having approximately the same inclination as the aforesaid beveled cutting-edge defining surface 30x.

From the above, taken with the previous description of the functioning of the FIG. 5 form of tool, it will be understood that as the tool T' is reciprocated against the continuous chain C, it will cut off a predetermined zipper length thereof suiting it to use as the zipper of a trouser-fly closure. It will also completely remove a length portion of the right-side plastic coil 12a as results in the provision of an element-free extension 12z at the bottom end of the right-side tape 12, and simultaneously therewith it will cut away the inner-end portions of the loops or convolutions of the left-side plastic coil 10a. Furthermore, by the action both of the heated blade-edge portions 34a, 36a incorporated into the cutting edge 30a of the blade 30 as described and of the heated pressure-applying surface 32d formed at the end of the punch 32, it will effect first a softening if not fusion of the plastic material both of the partial or outer-end portions of the loops or convolutions of the left-side coil 10a which are disposed immediately above the transverse line of cut made by the knife edge 30a and of the endmost full loops or convolutions of the right-side coil 12a disposed immediately above the line of cut made by the end edge proper of the punch 32 and then a mashing down and reshaping of the softened or fused loops or portions thereof to the form of plastic-spot seals designated c and c' in the FIGURES 6–8, which effectively seal the cut-through ends of the thread or threads of the stitches 14a and 16a to the respective tapes 10 and 12, and thereby prevent loosening of the threads and/or stitches from said tapes.

FIG. 10 illustrates what may be termed a carrying forward or development of the thread-to-tape sealing action according to the invention over that previously described in connection with FIGS. 6–9. More particularly, FIG. 10 shows that the threads of the stitches 14a which secure the partial or outer-end portions of the loops or convolutions of the left-side coil 10a which remain secured to the tape 10 are sealed to said tape for the full length of the tape extensions provided by the action of the punch 32 thereon, thereby to substantially increase the length of and thereby the security provided by the herein thread seal. Such thread-sealing "in length," as distinguished from spot-sealing, is preferably achieved by providing the punch 32 with an elongate pressure-applying surface or step comparing to that designated 32d, but which extends fully along the one cutting edge of the punch 32 which partially cuts away the plastic coil 10a.

The action of such a further modified punch (which is heated as previously explained) and its pressure-applying surface or step is to soften the cut-through outer-end portions of the loops or convolutions of the plastic coil 10a remaining on the tape 10 and then to mash down and reshape same into the form of a flattened or strip-form seal $c^2$ which seals the threads of the stitches securing said remaining outer-end portions for the full length of the tape extension.

Without further analysis, it will be appreciated that, consequent to the sealing of the threads which secure the plastic coil constituting the fastener elements of a plastic-coil zipper length of chain to their respective tapes at the particular location or locations where the stitches are likely to loosen from the respective tapes through which they pass, highly beneficial results are attained. More particularly, by virtue of the fact that the plastic coils or portions thereof sewn to the tapes cannot become displaced and/or "stick up" from their tapes at or adjacent the ends thereof which are cut through, and particularly the ends thereof to which the zipper must be assembled, a zipper length of plastic coil chain having a more finished appearance than hitherto possible is attained, and also the assembly of the slider to the bottom end of each zipper length is greatly facilitated.

I claim:

1. The method of producing zipper-closure lengths of plastic coil-type slide fastener chain from a long, continuous strip of such chain consisting of elongate continuous tapes having intermeshed plastic coils secured thereto along adjacent tape edges by longitudinal lines of stitching passing through said tapes, which comprises the steps of:

cutting-apart a succession of zipper-closure lengths of chain from said continuous chain strip along transverse lines of cut extending across said tapes, coils and lines of stitches; and applying heat and pressure thereto sufficient to soften and thereupon reshape predetermined portions of those convolutions of at least one plastic coil which are disposed adjacent the transverse lines of cut to the form of thread seals which fix the cut ends of the threads of the stitches securing the predetermined portions to the tape.

2. The method according to claim 1, wherein said cutting-apart step also effects cutting away of the relatively inner-end portions of the convolutions of said one plastic coil for a short length of the chain starting from each line of cut, and wherein said predetermined portions of those convolutions which are heated and reshaped as aforesaid comprise the retained outer-end portions of said convolutions.

3. A method according to claim 2, wherein the cutting-apart, the cutting-away and the heating and reshaping steps are carried out substantially simultaneously.

4. A method according to claim 1, and the further step of:

cutting away the intermeshing inner-end portions of the convolutions of both plastic coils of each zipper length of chain next to be cut apart from the continuous chain for short-length portions thereof beginning with said lines of cut, thereby to provide tape extensions at the relatively bottom ends of said zipper lengths; and wherein said predetermined portions of the convolutions which are heated and reshaped as aforesaid comprise the retained outer-end portions of said convolutions.

5. The method according to claim 4, wherein the cutting-apart, the cutting-away and the heating and reshaping steps are carried out simultaneously.

6. The method according to claim 1, and including the further step of:

cutting away one plastic coil and the edge portion of the tape to which it is secured from each of the zipper lengths of chain next to be cut apart from the continuous chain for short-length portions thereof beginning with said lines of cut whereby to provide tape extensions at the relatively bottom ends of said zipper lengths, and simultaneously therewith cutting away the inner-end portions of the convolutions of the other plastic coil which previously intermeshed with the convolutions of the cut-away lengths of said one plastic coil; and wherein said predetermined portions of the convolutions which are heated and reshaped as aforesaid comprise the retained outer-end portions of said convolutions.

7. The method according to claim 6, wherein the cutting-apart, the cutting-away and the heating and reshaping steps are carried out substantially simultaneously.

8. The method of treating the bottom end of a zipper length of plastic-coil fastener chain consisting of zipper-length tapes separably secured together along adjacent longitudinal edges by corresponding lengths of intermeshed plastic coil secured by stitches to said edges, in manner as both to provide a tape extension thereat and to facilitate assembly of the zipper-operating slider thereto, which includes the steps of:

partially cutting away the convolutions of at least one plastic coil from its tape for a short length thereof beginning at the relatively bottom edge of said tape and extending upwardly therefrom as provides a tape extension on the latter, softening the remaining portions of at least those convolutions of said one plastic coil which are disposed adjacent said bottom edge, and pressure-shaping said softened portions to the form of a thread seal which by sealing the coil-securing stitches to the tape adjacent said bottom edge prevents displacement of the partially cut-away coil from its tape.

9. The method according to claim 8, including the further steps of:

completely cutting away the other plastic coil from its tape for a short-length portion thereof also beginning at the relatively bottom line of its said tape and extending upwardly therefrom for a corresponding short length of its said tape, as effects cutting-through of the threads of the stitches which secure said other plastic coil to its tape adjacent its now bottom end; and similarly softening and pressure-shaping the lowermost convolutions of said other plastic coil to the form of a thread seal which also effects sealing of said latter stitches to said tape.

10. The method of securing the end of a plastic coil of a plastic coil-type zipper against displacement with respect to the tape to which it is stitched by threads which tend to loosen from said tape, which includes the steps of:

cutting-away the inner-end portions of at least the endmost convolutions of the plastic coil from the outer-end portions of said convolutions with which latter said threads are engaged whereby they remain on the tape;

and substantially simultaneously therewith softening the remaining outer stitch-secured portions of at least said endmost convolutions and pressure-shaping said softened portions to the form of a thread seal effective to seal at least the ends of the threads of the stitches to said tape.

References Cited

UNITED STATES PATENTS 3,333,305  8/1967  Taylor.
3,128,543  4/1964  Fasciano.

FOREIGN PATENTS 900,183  7/1968  Great Britain.

PHILIP DIER, Primary Examiner

U.S. Cl. X.R.

24—205.11; 29—408; 156—196, 251, 269, 515